Patented May 5, 1942

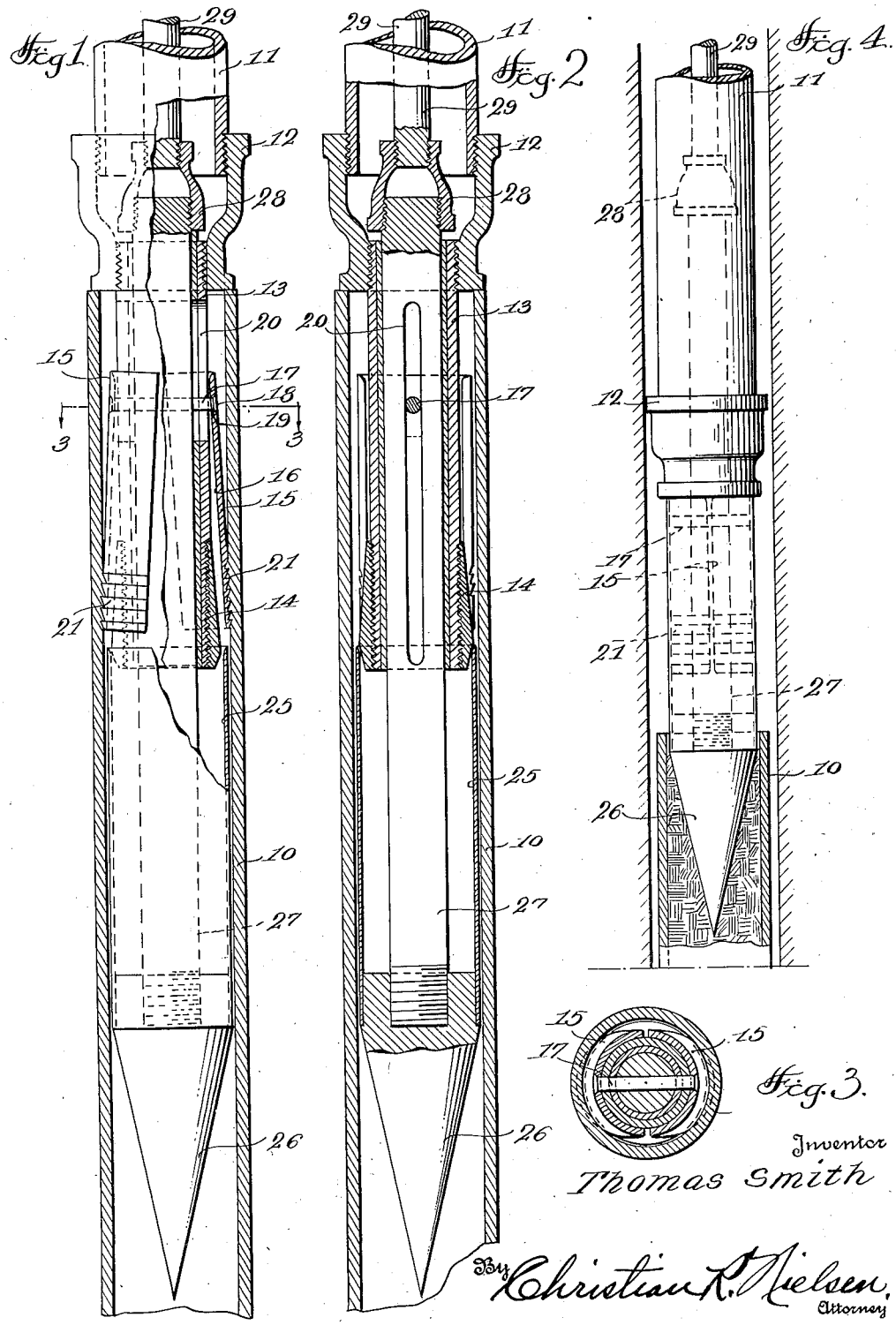

2,282,095

UNITED STATES PATENT OFFICE 2,282,095

RETRIEVING DEVICE FOR PIPES IN DEEP WELLS

Thomas Smith, Columbus, Ky.

Application July 26, 1941, Serial No. 404,250

6 Claims. (Cl. 294—96)

The invention relates to means for recovering pipes such as casings, or other tubular members from deep wells, particularly when broken or disconnected from upper portions of such pipes or casings.

The invention has for an object to effect a simplification in such apparatus, utilizing principles of grappling devices for such purposes heretofore provided.

An important object of the invention is to provide a novel means for insuring the proper introduction of a grappling device into a well and lost pipe and the like, to the end that there will be a minimum likelihood of impeding dirt, sand or the like becoming engaged in the device before it may function in its grappling action. Another important aim of the invention is to provide a novel means for controlling the operation of the grapple, so that it may be released at will from above ground.

A very important aim of the invention is to present a construction which may be produced at low cost in a rugged form, liable in a minimum degree to derangement, and adapted to be made in adequate strength for the purposes required.

Additional objects, advantages and features of invention reside in the construction, arrangement and combination of parts involved in the embodiment of the invention, as will be understood more fully from the following description and accompanying drawing, wherein Figure 1 is a sectional view of a well casing with my invention engaged therein, and shown partly in elevation, Figure 2 is a similar view at right angles to Figure 1, Figure 3 is a cross section on the line 3—3 of Figure 1.

Figure 4 is an elevational view of the device, and positioned within a well.

Referring more particularly to the drawing, there is illustrated a section of pipe, casing or the like, 10, the upper part of which has been broken off, and this lower part as shown is to be recovered by the use of my invention. The grappling or recovery device consists of a suitable length of cast pipe or tubing 11, which may be in sections, so as to extend to a suitable height above the grappling portion of the tool, and may extend above the ground level, or a cable connection may be effected with the upper end of this tubing. On its lower end there is connected a reducer coupling or fitting 12, with its reduced end downwardly, into which a reinforced tube or pipe 13 is introduced and secured permanently. This pipe has fixed on its lower end an annular mandrel 14, downwardly tapered so that the circumference thereof externally increases gradually toward the lower end thereof, which end is coincident with the end of the shank tube 13. The mandrel is fixed upon the shank tube, preferably united permanently therewith in a secure manner. Longitudinally slidable upon the shank exteriorly thereof, and below the coupling 12, there is a split sleeve or web device consisting of two slips 15, substantially semi-circular in cross section, and adapted to fit snugly around the shank 13 concentrically, at their upper parts, their lower parts being bevelled or shaped with a gradually enlarged inner face portion, so that the slips are themselves slightly wedge-shaped at their lower ends, but with their reduced portions at their lower ends, as indicated at 16. The upper ends of the slips 15 are pivotally connected so as to swing radially outward and inward with respect to the shank 13, the connection being in the present instance effected by means of a cross pin 17, having heads 18 at each end engaged in countersunk openings or sockets 19 in the respective slips, so that universal pivotal movement of the slips on the pins is permitted. The pin 17 is engaged through the shank 13 diametrically, the shank having longitudinal slots in opposite sides in which the pin 17 is longitudinally slidable. The slots extend from closely adjacent the coupling 12 to a distance therebelow somewhat greater than the length of the mandrel 14, and so located with respect to the mandrel that movement of the pin 17 downwardly will permit the slips at their lower parts to extend past the portion of major diameter of the mandrel 14. The slips 15 have a roughened face at 21 on their external lower surfaces, and in practice, these slips have been made by severing a section of pipe threaded at one end, the severance being in a diametrical plane of the pipe. The external surfaces of the slips are preferably formed with a shape to fit snugly within the pipe to be recovered, and if desired, the pin 17 may be a removable bolt, permitting the use of slips of appropriate sizes for different pipes. The diameter of the mandrel 14 is sufficient so that when drawn upwardly within the slips, it will wedge them outwardly against the inner face of the pipe 10 to be recovered, and will be of a diameter less than the interior diameter of the pipe 10. The slips 15 are also of such size that when located above the mandrel 14 and set inwardly close against the shank 13, they will also lie within a radius corresponding to that of the interior of the pipe 10 to be recovered. In the present instance the slips as well as the mandrel 14 are of a diameter considerably less than that of the pipe to be recovered, so as to permit the movement over the wedge and over the slips when retracted, of a guard and release sleeve 25, which may be of comparatively thin tubing, adapted to slide upwardly around the device as far as the coupling piece 12, when the slips are retracted to their minimum diameter and located above the mandrel, the sleeve likewise being of a diameter less than that of the pipe 10 to be recovered, so that it may slide freely in the pipe or casing to be recovered. The lower end of the sleeve 25 is formed with a penetrating or lead point 26, which may be of solid metal of suitable hardness and strength for penetrating hard earth, and sand, or such materials as accumulation of rust in a casing to be recovered. It is fixed upon an operating rod 27, of adequate strength, this being shown in the present instance as a tubular member. This rod is longitudinally slotted diametrically, so as to pass freely the pin 17, which is engaged therethrough. The upper end of the rod has a coupling device 28 thereon which may be connected to a rod extension 29, which may be extended above ground, or may have connected thereto a hoist line, if desired, the latter not being illustrated.

In the use of this device, the grappling unit as described being mounted suitably upon a hoist pipe or other hoist means, and the rod 27 being connected with a separate hoist means, the device is operated so as to retract or lift the slips 15 to the upper limit of their movement, and to engage the sleeve 25 thereover and therearound, in close relation or abutment with the coupling 12. The parts of the device are thereby completely enclosed and protected from access of sand, grit, dirt or other materials which might obstruct movement of the parts, as will be readily appreciated. In order to hold the parts in this assembled relation, sufficient lift is applied to the hoist means connected with the rod to hold the sleeve in its elevated position while the device is lowered in a well or elsewhere. If desired, the device may be entirely supported by the hoist or other means connected to the rod 27 and thereby lowered into a well or the like, so that the point 26 will enter the upper end of the pipe, casing or other piece to be recovered. In this lowering of the device, in case there is sand or the like interposed between the lost pipe and the surface, the use of a pipe 11 for presenting it in the well will enable the point 26 to be thrust through impeding material so as to insure its penetration to the pipe to be recovered. The point also serves as centering means to guide the device into the pipe to be withdrawn. Being certain that the device has entered the pipe which is to be recovered, the point means connected to the shank 13 is now utilized to support the device entirely, and all lift applied to the operating rod is released, so that the latter together with the sleeve 25 is free to move downwardly. By the use of rod extensions 29 the sleeve 25 may be forced downwardly so as to clear the slips 15 and mandrel 14, whereby it is moved to the position shown in Figure 2, with respect to the mandrel and slips. If desired, the movement of the rod 27 and the length of the slot therein may be such that the upper end of the slot will engage the pin 17 and thrust the latter downwardly, so as to force the pin downwardly between the mandrel 14 and the pipe to be recovered, after the sleeve 25 has cleared the slips. Also, the loose movement of the pin 17 in the slot of the device will permit the slips to move downwardly by gravity. After the slips have become initially engaged between the mandrel 14 and pipe to be extracted, hoisting force being applied to the pipe 11 or other hoisting means has been connected to the shank 13, the mandrel 14 is drawn upwardly within the slips, so as to force the latter outwardly slightly against the inner surfaces of the pipe 10, and this hoisting continued until the pipe 10 is raised. Gripping of the slips will become more effective, as the hoisting force applied through the wedge is increased, as will be readily understood, so that the device will function with great certainty.

Should it be necessary to release the device before the pipe 10 is hoisted, this may be effected by raising the rod 27, which will draw the sleeve 25 upwardly, the upper edge of the sleeve engaging the lower edges of the slips, so as to force the latter upwardly, disengaging the slips from between the mandrel 14 and the pipe 10, and effecting release of the latter from the device. The complete device may now be hoisted from the well or other situation in which the pipe 10 is located, should that be desired. It is possible that after the slips have been cleared from their wedged engagement with the pipe 10, the sleeve 25 will pass upwardly around the slips, and hold them in extracted position, and the upper end of the sleeve 25 is bevelled on the inner side for this purpose, in addition to which the lower ends of the slips 15 may also be bevelled toward their outer sides.

If desired, the device may be simplified by omission of the hoist rod and guard sleeve, in which event, the slips 15 will tend to operate by gravity, and may be used as a simple grapple by lowering the device consisting of the shank and mandrel with the slips mounted thereon, until the wedge enters the pipe to be recovered, followed by the slips, after which, upward movement of the mandrel will draw the latter between the slips while the latter are located within the pipe to be raised, causing the wedging of the slips against the pipe and permitting finally the hoisting of the pipe by lifting of the shank and mandrel. The lower end of the wedge is bevelled on the outer side, to facilitate its entry into a pipe, or within the sleeve 25.

While I have described my invention with great particularity in the best form in which I have thus far embodied it, it will, nevertheless, be understood that various modifications in construction, arrangement and combination of parts, substitution of materials and substitution of equivalents may be made without departing from the spirit of the invention, as may be more fully determined from the claims hereto appended.

I claim:

1. A device of the character described comprising an annular mandrel enlarged exteriorly at its lower part for wedging action and having a coaxial shank extended therefrom at its reduced portion, longitudinally arranged slip members beside the shank and connected for simultaneous movement longitudinally along the mandrel, a sleeve device constructed and arranged to enclose the mandrel and slip members when in retracted position, a hoist means connected with the mandrel, and separate support means connected with the sleeve and adapted to permit downward movement of the latter around the mandrel and the slip members when the latter are moved on a vertical axis.

2. A device of the character described, comprising an annular mandrel enlarged exteriorly at its lower part for wedging action and having a coaxial shank extended therefrom at its reduced portion, longitudinally arranged slip members beside the shank and connected for simultaneous movement longitudinally along the wedge, a sleeve device constructed and arranged to enclose the mandrel and the slip members when in retracted position, a hoist means connected with the mandrel, and separate support means connected with the sleeve and adapted to permit downward movement of the latter around the mandrel and said slip members, the means for hoisting the mandrel consisting of means connected with said shank, and the means for separately supporting said sleeve consisting of an internal coaxial connection member slidable through said shank, said shank and connecting member being longitudinally slotted, supporting pins engaged therethrough and with said slip members, the slot in the connecting member being limited in length at the upper part so as to engage such pin on downward movement of the sleeve below said slip members.

3. The structure of claim 1, in which support means for such include a hoist device, whereby the sleeve may be drawn upwardly against the slip members and to thrust the latter upwardly when the sleeve is hoisted, for the purposes described.

4. The structure of claim 1, in which said sleeve is formed with a penetrating point for the purposes described.

5. The structure of claim 1, in which said shank is formed with an enlargement at its upper end, said sleeve being constructed and arranged to engage said enlargement when in enclosing relation to the mandrel and the slip members.

6. The structure of claim 1, in which the hoist means for the mandrel consists of a rigid member connected to the upper end of the shank, and said shank has an enlarged element at the upper end thereof adapted to receive the end of said sleeve snugly thereagainst as a closure and thrust means, said sleeve having also a penetration point at its lower end, whereby it may be forced through impeding material in wells and the like.

THOMAS SMITH.